(12) United States Patent
Cilfone et al.

(10) Patent No.: US 9,167,277 B2
(45) Date of Patent: Oct. 20, 2015

(54) DISPERSED STORAGE NETWORK DATA MANIPULATION

(75) Inventors: Bart Cilfone, Chicago, IL (US); Wesley Leggette, Oak Park, IL (US); Jason K. Resch, Chicago, IL (US)

(73) Assignee: Cleversafe, Inc., Chicago, IL (US)

( * ) Notice: Subject to any disclaimer, the term of this patent is extended or adjusted under 35 U.S.C. 154(b) by 941 days.

(21) Appl. No.: 12/776,098

(22) Filed: May 7, 2010

(65) Prior Publication Data

US 2011/0026842 A1 Feb. 3, 2011

Related U.S. Application Data

(60) Provisional application No. 61/230,937, filed on Aug. 3, 2009.

(51) Int. Cl.
| | |
|---|---|
| *H04N 7/12* | (2006.01) |
| *H04N 11/02* | (2006.01) |
| *H04N 11/04* | (2006.01) |
| *H04N 21/231* | (2011.01) |
| *H04N 21/258* | (2011.01) |
| *H04N 21/2747* | (2011.01) |
| *H04L 29/08* | (2006.01) |
| *G06F 11/10* | (2006.01) |

(52) U.S. Cl.
CPC ...... *H04N 21/23116* (2013.01); *H04L 67/1097* (2013.01); *H04N 21/25875* (2013.01); *H04N 21/2747* (2013.01); *G06F 11/1076* (2013.01)

(58) Field of Classification Search
None
See application file for complete search history.

(56) References Cited

U.S. PATENT DOCUMENTS

| | | |
|---|---|---|
| 4,092,732 A | 5/1978 | Ouchi |
| 5,454,101 A | 9/1995 | Mackay et al. |
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |

(Continued)

OTHER PUBLICATIONS

Shamir; How to Share a Secret; Communications of the ACM; vol. 22, No. 11; Nov. 1979; pp. 612-613.

(Continued)

*Primary Examiner* — Joseph Ustaris
*Assistant Examiner* — Kevin McInnish
(74) *Attorney, Agent, or Firm* — Garlick & Markison; Timothy W. Markison

(57) ABSTRACT

A method begins by a processing module receiving data for dispersed storage, wherein the data has an associated user identification (ID), and obtaining a codec flag based on the associated user ID. The codec flag may indicate one or more codec types and a codec execution order. The codec types may include two or more of: a null data manipulation, one or more versions of a data integrity function, one or more versions of a compression function, and/or one or more versions of an encryption function. The method continues with the processing module manipulating the data to produce manipulated data utilizing the one or more codec types in the codec execution order, encoding the manipulated data using an error coding dispersal storage function to produce a plurality of encoded data slices, and sending the slices and codec flag to a plurality of DS storage units for storage.

20 Claims, 9 Drawing Sheets

(56) References Cited

U.S. PATENT DOCUMENTS

| | | | |
|---|---|---|---|
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,636,724 | B2 | 12/2009 | de la Torre et al. |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma et al. |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula, Jr. |
| 2005/0132070 | A1 | 6/2005 | Redlich et al. |
| 2005/0144382 | A1 | 6/2005 | Schmisseur |
| 2005/0229069 | A1 | 10/2005 | Hassner |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll, Jr. |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0165865 | A1* | 7/2007 | Talvitie ............... 380/286 |
| 2007/0174192 | A1 | 7/2007 | Gladwin et al. |
| 2007/0192542 | A1* | 8/2007 | Frolund et al. ............ 711/119 |
| 2007/0214285 | A1 | 9/2007 | Au et al. |
| 2007/0234110 | A1 | 10/2007 | Soran et al. |
| 2007/0283167 | A1 | 12/2007 | Venters, III et al. |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner computing system 10

DISPERSED STORAGE NETWORK DATA MANIPULATION

CROSS REFERENCE TO RELATED PATENTS

This patent application is claiming priority under 35 USC §119 to a provisionally filed patent application entitled DISPERSED STORAGE NETWORK DATA MANIPULATION, having a provisional filing date of Aug. 3, 2009, and a provisional Ser. No. 61/230,937.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of Invention

This invention relates generally to computing systems and more particularly to data storage solutions within such computing systems.

2. Description of Related Art

Computers are known to communicate, process, and store data. Such computers range from wireless smart phones to data centers that support millions of web searches, stock trades, or on-line purchases every day. In general, a computing system generates data and/or manipulates data from one form into another. For instance, an image sensor of the computing system generates raw picture data and, using an image compression program (e.g., JPEG, MPEG, etc.), the computing system manipulates the raw picture data into a standardized compressed image.

With continued advances in processing speed and communication speed, computers are capable of processing real time multimedia data for applications ranging from simple voice communications to streaming high definition video. As such, general-purpose information appliances are replacing purpose-built communications devices (e.g., a telephone). For example, smart phones can support telephony communications but they are also capable of text messaging and accessing the internet to perform functions including email, web browsing, remote applications access, and media communications (e.g., telephony voice, image transfer, music files, video files, real time video streaming. etc.).

Each type of computer is constructed and operates in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc. are now being stored digitally, which increases the demand on the storage function of computers.

A typical computer storage system includes one or more memory devices aligned with the needs of the various operational aspects of the computer's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller.

Despite the standardization of the computer and its storage system, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to utilize a higher-grade disc drive, which adds significant cost to a computer.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n−1=capacity). RAID 6 can recover from a loss of two discs and requires a minimum of four discs with a storage capacity of n−2.

While RAID addresses the memory device failure issue, it is not without its own failure issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

BRIEF DESCRIPTION OF THE SEVERAL VIEWS OF THE DRAWING(S)

DETAILED DESCRIPTION OF THE INVENTION

Figure 1:
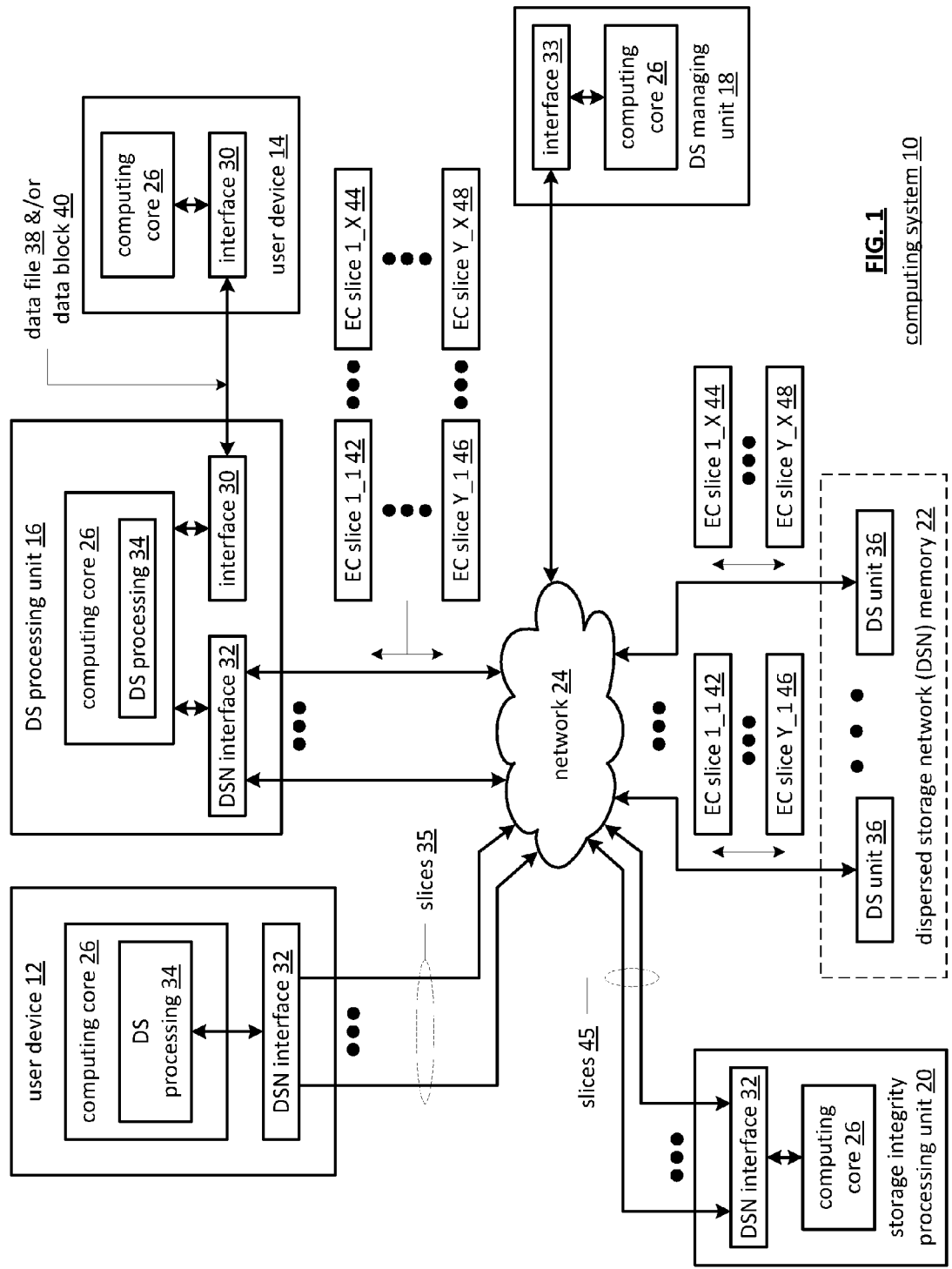
FIG. 1 is a schematic block diagram of an embodiment of a computing system in accordance with the invention.

FIG. 1 is a schematic block diagram of a computing system 10 that includes one or more of a first type of user devices 12, one or more of a second type of user devices 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.). The processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that if the processing module includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module executes, hard coded and/or operational instructions corresponding to at least some of the steps and/or functions illustrated in FIGS. 1-9.

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 and/or directly. For example, interfaces 30 support a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general and with respect to data storage, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a read threshold value (e.g., the minimum number of slices required to reconstruct the data segment).

As another example, the DS managing module 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times a user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices' and/or units' activation status, determines the devices' and/or units' loading, and any other system level operation that affects the performance level of the system 10. For example, the DS managing unit 18 receives and aggregates network management alarms, alerts, errors, status information, performance information, and messages from the devices 12-14 and/or the units 16, 20, 22. For example, the DS managing unit 18 receives a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 determines that the DSN memory 22 needs more DS units 36 or that one or more of the DS units 36 needs updating.

The second primary function (i.e., distributed data storage and retrieval) begins and ends with a user device 12-14. For instance, if a second type of user device 14 has a data file 38 and/or data block 40 to store in the DSN memory 22, it sends the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) process 34 thereon (e.g., an error coding dispersal storage function). The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., $2^1$ to $2^n$ bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, or error correction coding) and slices (or slices then error encodes) the data segment into a plurality of error coded (EC) data slices 42-48, which is represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each EC slice 42-48, the DS processing unit 16 creates a unique slice name and appends it to the corresponding slice EC 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices 45 for transmission via the network 24. For example, the DSN interface 32 may utilize an internet protocol (e.g., TCP/IP, etc.) to packetize the EC slices 42-48 for transmission via the network 24.

The number of DS units 36 receiving the EC slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improve data storage integrity and security. Further examples of encoding the data segments will be provided with reference to one or more of FIGS. 2-9.

Each DS unit 36 that receives an EC slice 42-48 for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the device 12 encodes and slices the data file and/or data block it has to store. The device then transmits the slices 35 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments has been reconstructed, the DS processing unit 16 provides the data file 38 and/or data block 40 to the user device 14. Note that the first type of user device 12 performs a similar process to retrieve a data file and/or data block.

The storage integrity processing unit 20 performs the third primary function of data storage integrity verification. In general, the storage integrity processing unit 20 periodically retrieves slices 45, and/or slice names, of a data file or data block of a user device to verify that one or more slices have not been corrupted or lost (e.g., the DS unit failed). The retrieval process mimics the read process previously described.

If the storage integrity processing unit 20 determines that one or more slices is corrupted or lost, it rebuilds the corrupted or lost slice(s) in accordance with the error coding scheme. The storage integrity processing unit 20 stores the rebuild slice, or slices, in the appropriate DS unit(s) 36 in a manner that mimics the write process previously described.

Figure 2:
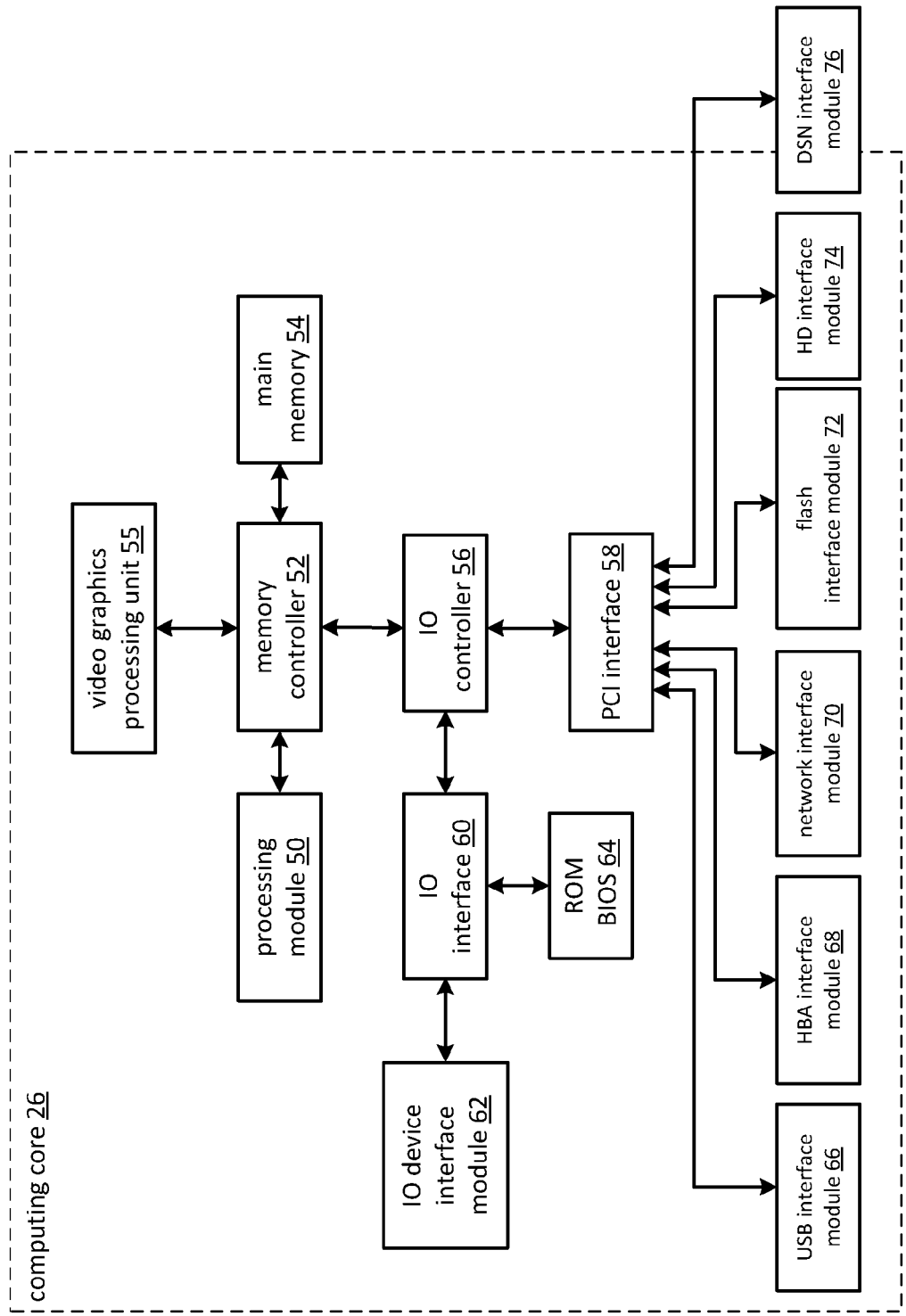
FIG. 2 is a schematic block diagram of an embodiment of a computing core in accordance with the invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface 60, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the IO device interface module 62 and/or the memory interface modules may be collectively or individually referred to as IO ports.

The processing module 50 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 50 may have an associated memory and/or memory element, which may be a single memory device, a plurality of memory devices, and/or embedded circuitry of the processing module 50. Such a memory device may be a read-only memory, random access memory, volatile memory, non-volatile memory, static memory, dynamic memory, flash memory, cache memory, and/or any device that stores digital information. Note that if the processing module 50 includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module 50 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module 50 executes, hard coded and/or operational instructions corresponding to at least some of the steps and/or functions illustrated in FIGS. 1-12.

Figure 3:
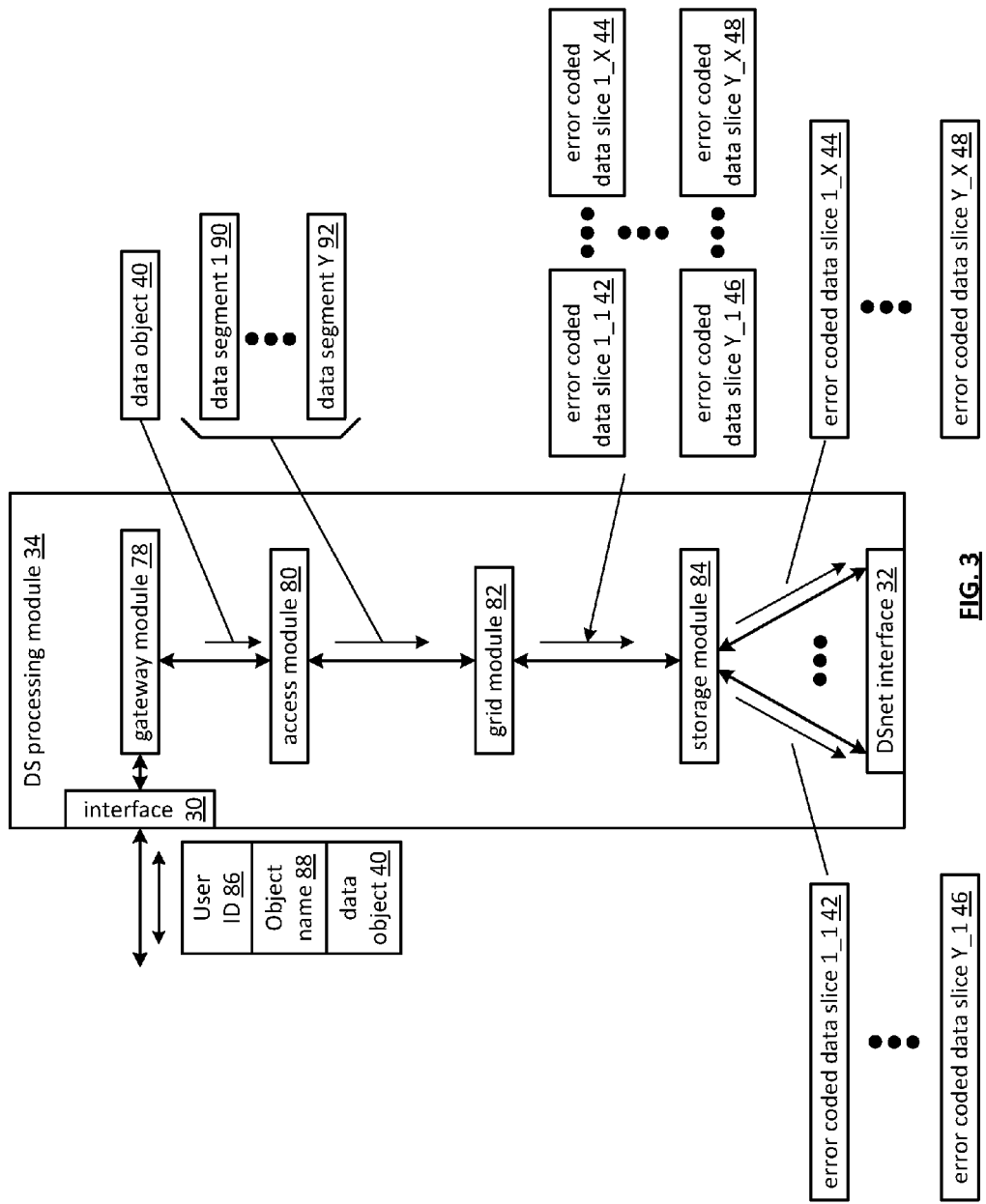
FIG. 3 is a schematic block diagram of an embodiment of a dispersed storage processing unit in accordance with the invention.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and the DSnet interface 32 or the interfaces 68 and/or 70 may be part of user device 12 or of the DS processing unit 16. The DS processing module 34 may further include a bypass/feedback path between the storage module 84 to the gateway module 78.

In an example of storing data, the gateway module 78 receives an incoming data object (e.g., a data file, a data block, an EC data slice, etc.) that includes a user ID field 86, an object name field 88, and the data object field 40. The gateway module 78 authenticates the user associated with the data object by verifying the user ID 86 with the managing unit 18 and/or another authenticating unit. When the user is authenticated, the gateway module 78 obtains user information from the management unit 18, the user device, and/or the other authenticating unit. The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, an encryption algorithm, a slicing parameter, a compression algorithm, an integrity check method, caching settings, parallelism settings, and/or other parameters that may be used to access the DSN memory layer.

The gateway module 78 uses the user information to assign a source name to the data. For instance, the gateway module 78 determines the source name of the data object 40 based on the vault identifier and the data object. For example, the source name may contain a data name (block number or a file number), the vault generation number, the reserved field, and the vault identifier. The data name may be randomly assigned but is associated with the user data object.

The access module 62 receives the data object 40 and creates a series of data segments 1 through Y 90-92 therefrom. The number of segments Y may be chosen or randomly assigned based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, if segment size is fixed, then the number of segments Y varies based on the size of data object. For instance, if the data object is an image file of 4,194,304 bytes and the fixed size of each segment is 4,096 bytes, then the number of segments Y=1,024. Note that each segment is associated with the source name.

The grid module 82 may pre-manipulate (e.g., compression, encryption, cyclic redundancy check (CRC), etc.) each of the data segments before performing an error coding function of the error coding dispersal storage function to produce a pre-manipulated data segment. The grid module 82 then error encodes (e.g., Reed-Solomon, Convolution encoding, Trellis encoding, etc.) the data segment or pre-manipulated data segment into X error coded data slices 42-44. The grid module 82 determines a unique slice name for each error coded data slice and attaches it to the data slice.

The value X, or the number of pillars (e.g., X=16), is chosen as a parameter of the error coding dispersal storage function. Other parameters of the error coding dispersal function include a read threshold T, a write threshold W, etc. The read threshold (e.g., T=10, when X=16) corresponds to the minimum number of error-free error coded data slices required to reconstruct the data segment. In other words, the DS processing module 34 can compensate for X−T (e.g., 16−10=6) missing error coded data slices per data segment. The write threshold W corresponds to a minimum number of DS storage units that acknowledge proper storage of their respective data slices before the DS processing module indicates proper storage of the encoded data segment. Note that the write threshold is greater than or equal to the read threshold for a given number of pillars (X).

The grid module 82 also determines which of the DS storage units 36 will store the EC data slices based on a dispersed storage memory mapping associated with the user's vault and/or DS storage unit 36 attributes. The DS storage unit attributes includes availability, self-selection, performance history, link speed, link latency, ownership, available DSN memory, domain, cost, a prioritization scheme, a centralized selection message from another source, a lookup table, data ownership, and/or any other factor to optimize the operation of the computing system. Note that the number of DS storage units 36 is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the EC data slices and, when successful, transmits the EC data slices 1 through X of each segment 1 through Y to the DS Storage units. Each of the DS storage units 36 stores its EC data slice and keeps a table to convert the virtual DSN address of the EC data slice into physical storage addresses.

In an example of a read operation, the user device 12 and/or 14 sends a read request to the DS processing unit 16, which authenticates the request. When the request is authentic, the DS processing unit 16 sends a read message to each of the DS storage units 36 storing slices of the data object being read. The slices are received via the DSnet interface 32 and processed by the storage module 84, which performs a parity check and provides the slices to the grid module 82 when the parity check was successful. The grid module 82 decodes the slices in accordance with the error coding dispersal storage function to reconstruct the data segment. The access module 80 reconstructs the data object from the data segments and the gateway module 78 formats the data object for transmission to the user device.

Figure 4:
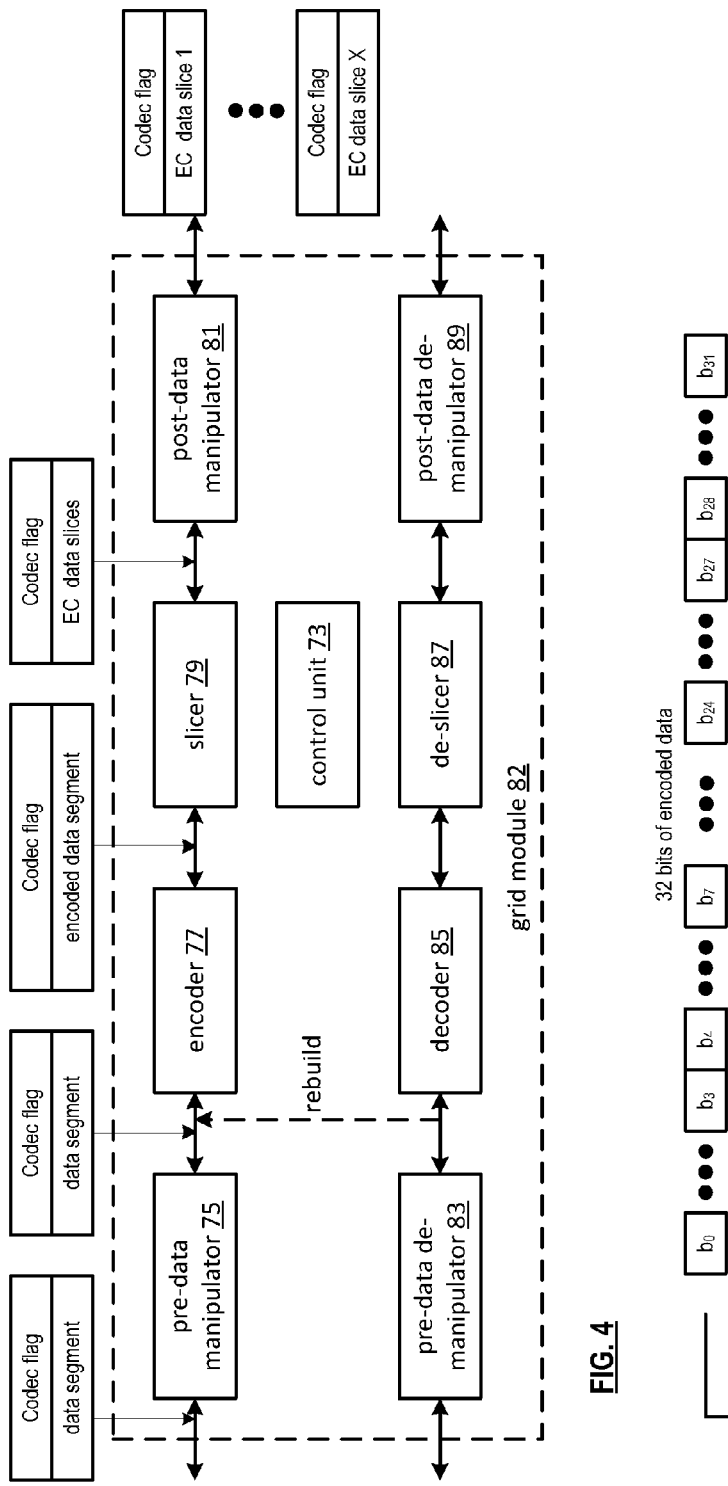
FIG. 4 is a schematic block diagram of an embodiment of a grid module in accordance with the invention.

FIG. 4 is a schematic block diagram of an embodiment of a grid module 82 that includes a control unit 73, a pre-data manipulator 75, an encoder 77, a slicer 79, a post-data manipulator 81, a pre-data de-manipulator 83, a decoder 85, a de-slicer 87, and/or a post-data de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

In an example of write operation, the grid module 82, via the pre-data manipulator 75, receives a data segment 90-92 and a write instruction from an authorized user device. In addition, the grid module 82 obtains a corresponding codec flag based on a user ID of the authorized user. For example, the grid module may obtain the codec flag by identifying a vault identity (ID) based on the associated user ID; by identifying a registry descriptor based on the vault ID; by accessing the registry descriptor to retrieve vault information, wherein the vault information includes one or more of a codec stack, a data manipulation table, the codec types, the codec execution order; and/or by determining the codec flag based on the vault information. In another embodiment, the grid module may obtain the codec flag by identifying the vault ID based on a received vault ID.

In general, the codec flag indicates how the corresponding data segment is to be processed by the grid module 82. The grid module 82 may process the data segment by transforming the data segment in a reversible way such that a resulting transformed data segment may be subsequently restored into the data segment. For example, the codec flag may indicate one or more types and/or versions of pre-data manipulation & de-manipulation to be performed on the corresponding data segment by the pre-data manipulator 75 and the pre-data de-manipulator 83. As another example, the codec flag may indicate one or more types and/or versions of error encoding & decoding to be performed on the corresponding data segment by the encoder 77 and the decoder 85 apply to the (encoded) data segments. As yet another example, the codec flag may indicate one or more types and/or versions of slicing & de-slicing to be performed on the corresponding data segment by the slicer 79 & the de-slicer 87. As a further example, the codec flag may indicate one or more types and/or versions of post-data manipulation & de-manipulation to be performed by the post-data manipulator 81 and the post-data de-manipulator 89. The codec flag may also include information regarding one or more of: DS storage memory mapping, status of DS storage units, performance history of DS storage units, capability of DS storage units, prioritization information for DS storage unit usage, and rebuilding data.

The pre-data manipulator 75 determines if pre-manipulation of the data segment 90-92 is required and, if so, what type. The pre-data manipulator 75 may make the determination independently based on the codec flag and/or from an instruction from the control unit 73. In the latter case, the control unit 73 interprets the codec flag and provides the instruction on the pre-data manipulation to be performed.

Once a positive determination is made, the pre-data manipulator 75 manipulates the data segment 90-92 in accordance with the type of manipulation to produce a pre-manipulated data segment. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard (DES), Advanced Encryption Standard, etc.), adding metadata (e.g., time/date stamping, user information, file type, etc.), data integrity such as cyclic redundancy check (e.g., CRC32), and/or other data manipulations to produce the pre-manipulated data segment. In an alternative embodiment, the pre-data manipulator 75 may determine whether the data segment is already compressed based on a randomness test. The pre-data manipulator 75 may compress the data segment when the pre-data manipulator 75 determines that the data segment has not previously been compressed. The pre-data manipulator 75 may skip the compression step when the pre-data manipulator 75 determines that the data segment has been previously compressed. Note that each of these types of data manipulations may have one or more versions associated therewith. For example, the DES encryption may have several versions such as triple DES, G-DES, DES-X, ICE, etc.

The encoder 77 encodes the pre-manipulated data segment 92 using a forward error correction (FEC) encoder (and/or other type of erasure coding and/or error coding) to produce an encoded data segment 94. The encoder 77 determines which forward error correction algorithm to use as may be indicated in the codec flag and/or based on a predetermination associated with the user's vault, a time based algorithm, user direction, DS managing unit direction, control unit direction, as a function of the data type, as a function of the data segment 92 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 92, the same encoding algorithm for the data segments 92 of a data object, or a combination thereof.

The encoded data segment 94 is of greater size than the data segment 92 by the overhead rate of the encoding algorithm by a factor of (X/T), where X is the width or number of slices, and T is the read threshold. In this regard, the corresponding decoding process can accommodate at most X−T missing EC data slices and still recreate the data segment 92. For example, if X=16 and T=10, then the data segment 92 will be recoverable as long as 10 or more EC data slices per segment are not corrupted.

The slicer 79 transforms the encoded data segment 94 into EC data slices in accordance with the slicing parameter from the vault for this user and/or data segment 92 (e.g., as indicated in the codec flag). For example, if the slicing parameter is X=16, then the slicer slices each encoded data segment 94 into 16 encoded slices.

The post-data manipulator 81 performs, if enabled, post-manipulation on the encoded slices to produce the EC data slices. If enabled, the post-data manipulator 81 determines the type of post-manipulation, which may be based on information contained in the codec flag, a second codec flag, and/or based on a computing system-wide predetermination, parameters in the vault for this user, a table lookup, the user identification, the type of data, security requirements, available DSN memory, performance requirements, control unit directed, and/or other metadata. Note that the type of post-data manipulation may include slice level compression, signatures, encryption, CRC, addressing, watermarking, tagging, adding metadata, and/or other manipulation to improve the effectiveness of the computing system. Note that each module 75-81 of the grid module 82 may pass along the codec flag such each of the outputted encoded slices has the codec flag associated with it.

In an example of a read operation, the post-data de-manipulator 89 receives at least a read threshold number of EC data slices and performs the inverse function of the post-data manipulator 81 to produce a plurality of encoded slices. The de-slicer 87 de-slices the encoded slices to produce an encoded data segment 94. The decoder 85 performs the inverse function of the encoder 77 to recapture the data segment 90-92. The pre-data de-manipulator 83 performs the inverse function of the pre-data manipulator 75 to recapture the data segment.

Figure 5:
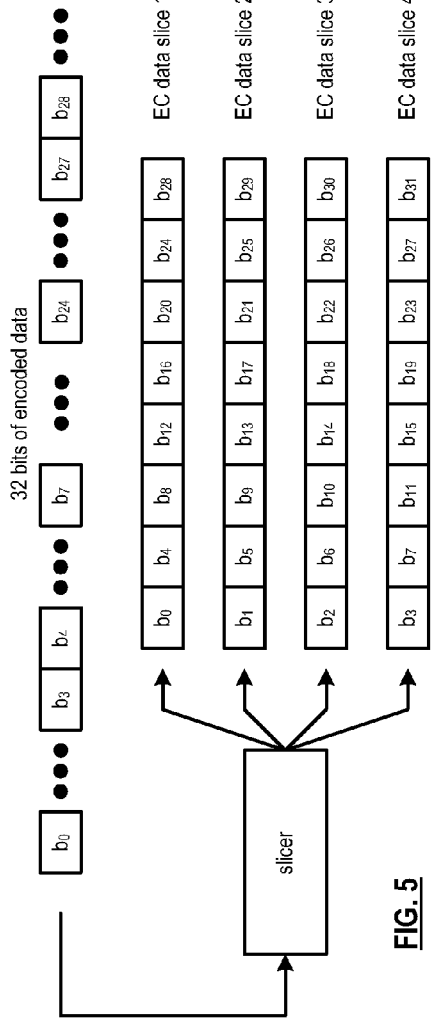
FIG. 5 is a diagram of an example embodiment of error coded data slice creation in accordance with the invention.

FIG. 5 is a diagram of an example of slicing an encoded data segment 94 by the slicer 79. In this example, the encoded data segment includes thirty-two bits, but may include more or less bits. The slicer 79 disperses the bits of the encoded data segment 94 across the EC data slices in a pattern as shown. As such, each EC data slice does not include consecutive bits of the data segment 94 reducing the impact of consecutive bit failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

Figure 6:
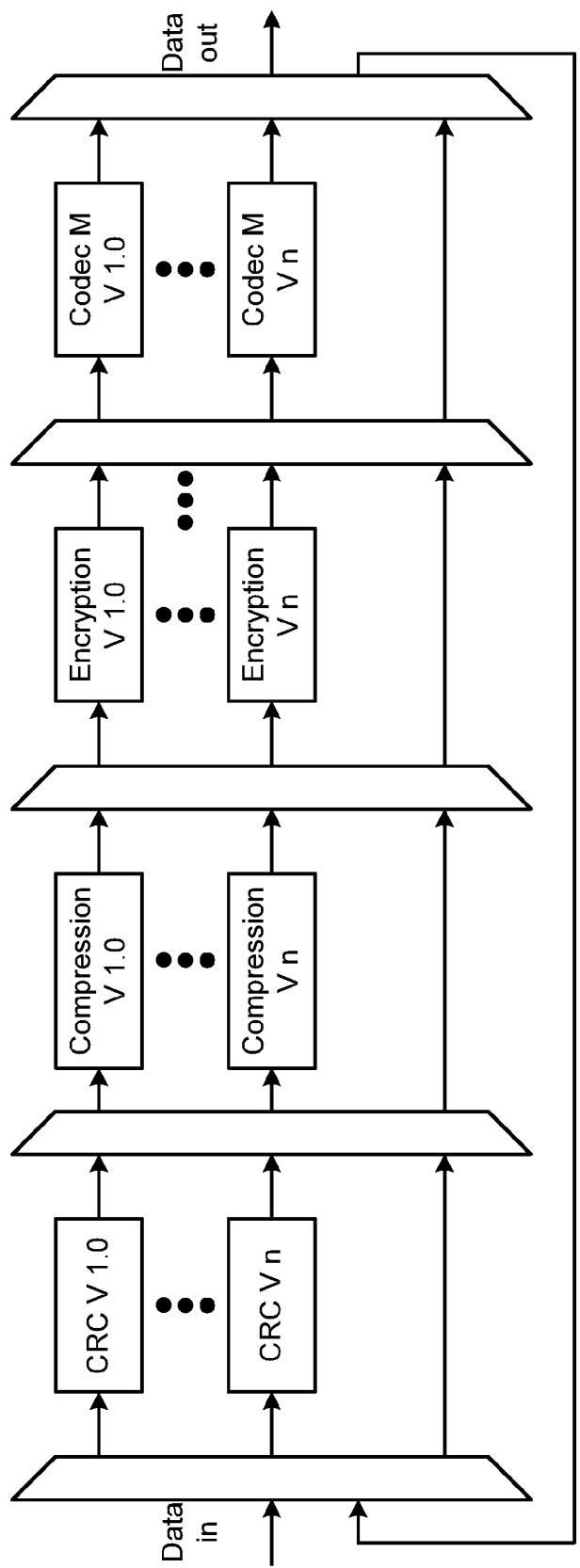
FIG. 6 is a schematic block diagram of an embodiment of a data manipulator in accordance with the invention.

FIG. 6 is a schematic block diagram of an embodiment of a data manipulator (e.g., pre-data manipulator 75 or post-data manipulator 81) that includes a plurality of M codec sets, a plurality of functional multiplexers (i.e., the multiplexers may be virtual devices or physical devices), and a feedback path. Each codec set includes up to n versions of a similar codec type and a by-pass path. For example, the CRC codec set includes a version 1.0 CRC, a version 2.0 CRC, etc., and a by-pass path. As such, the preceding and succeeding multiplexers of the CRCs may be enabled to provide an input and output connection to one of the versions of the CRC or to the by-pass path. Note that each codec set may have a different number of codec versions.

In an example of operation, the data manipulator receives a data segment and routes the data to a version 3.0 CRC codec in accordance with the codec stack (e.g., the codec stack as indicated by the codec flag and as will be described in greater detail with reference to one or more of FIGS. 7-12). The CRC V3.0 module performs a CRC function on the data segment to produce a CRC data segment.

The data manipulator routes the CRC data segment to a version 2.0 compression codec in accordance with the codec stack. The compression V2.0 module performs a compression function on the CRC data segment to produce a compressed data segment. The data manipulator then routes the compressed data segment to the output multiplexer in accordance with the codec stack. In another example, the CRC and compression functions may be by-passed and the data segment may be encrypted and/or some other data manipulation function performed thereon. In yet another example, all of the functions may be used to manipulate the data segment.

Figure 7:
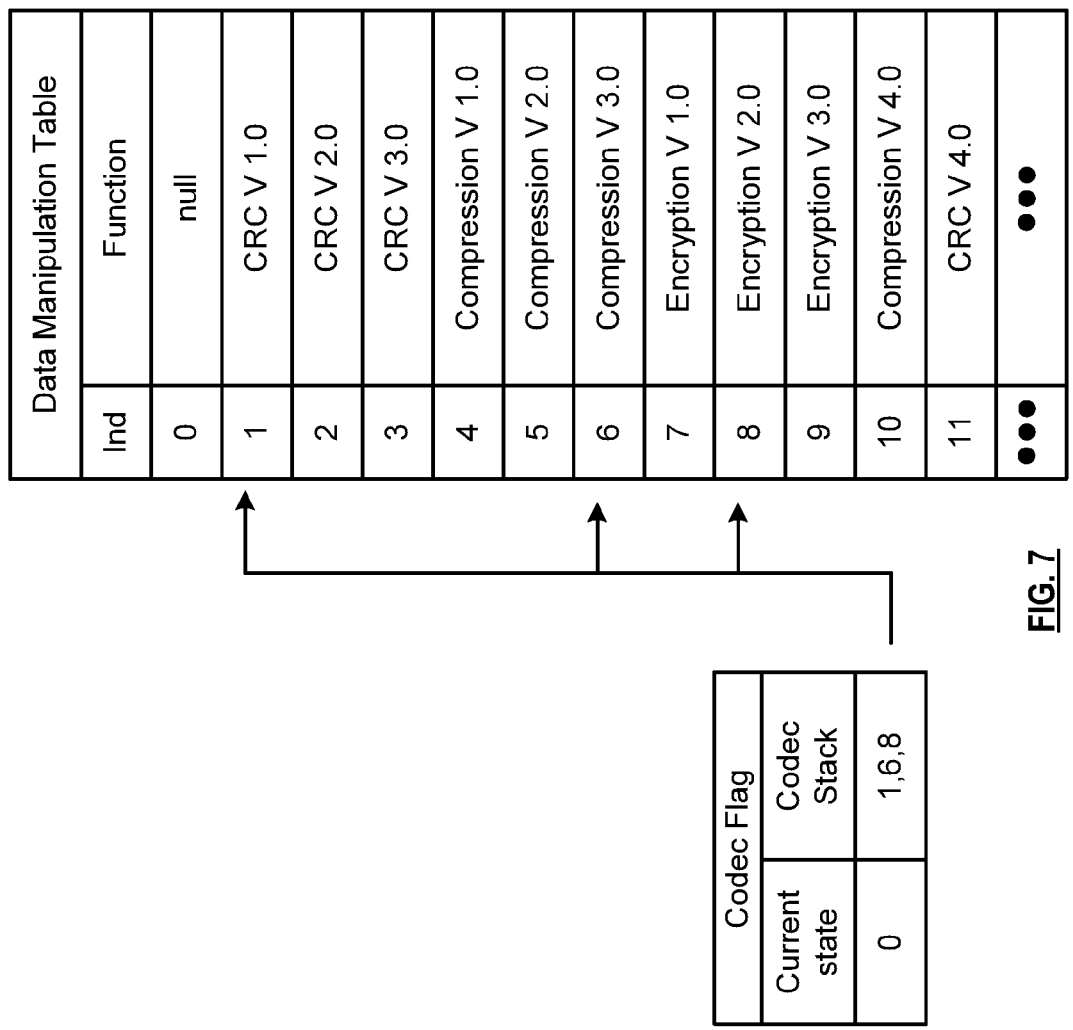
FIG. 7 is a diagram of an embodiment of a dispersed storage data manipulation table in accordance with the invention.

FIG. 7 is a diagram of an embodiment of codec flag and a corresponding data manipulation table. The codec flag includes a current state field and a codec stack field. The data manipulation table includes a number column and a corresponding function column. The number column contains a reference number for a corresponding codec function. For example, reference number 0 corresponds to a null function (e.g., a by-pass); reference number 1 corresponds to version 1.0 of a CRC codec function; reference number 2 corresponds to version 2.0 of the CRC codec function; reference number 4 corresponds to version 1.0 of a compression codec function; reference number 7 corresponds to version 1.0 of an encryption codec function.

The current state field of the codec flag indicates which of the codec functions is currently being processed for the data segment and the codec stack field indicates the codec functions and the order (e.g., left to right or right to left) that they are to be executed on the data segment. For example, a current state of 0 indicates that the data manipulator has yet to begin data manipulation on the data segment. When the data manipulator begins performing the first codec function indicated in the codec stack field, the current status field is updated to contain the reference number of the first codec function. In the example of FIG. 7, the first codec function is the CRC V 1.0, which has a reference number of 1.

The current state field continues to contain the reference number of the first codec function until the data manipulator begins performing the second codec function as indicated in the codec stack field. In this example, the second codec function is version 3.0 of a compression function, which has the reference number of 6. The current state field is updated with the reference number of the third codec function identified in the codec stack field when the data manipulator begins performing the third codec function (e.g., encryption V2.0, which has a reference number of 8). This process continues until the last codec function as indicated in the codec stack field is performed. In this example, the last codec function is the encryption V2.0 with reference number 8.

Figure 8:
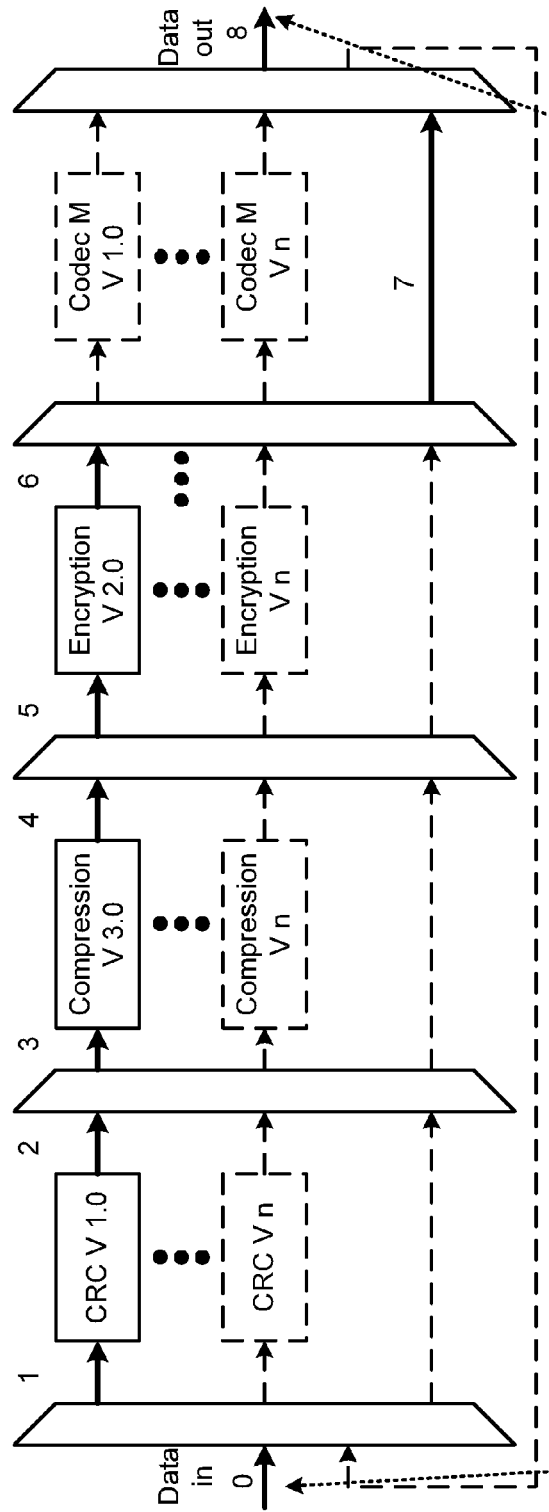
FIG. 8 is a schematic block diagram of an example of an embodiment of a data manipulator in accordance with the invention.
Figure 9:
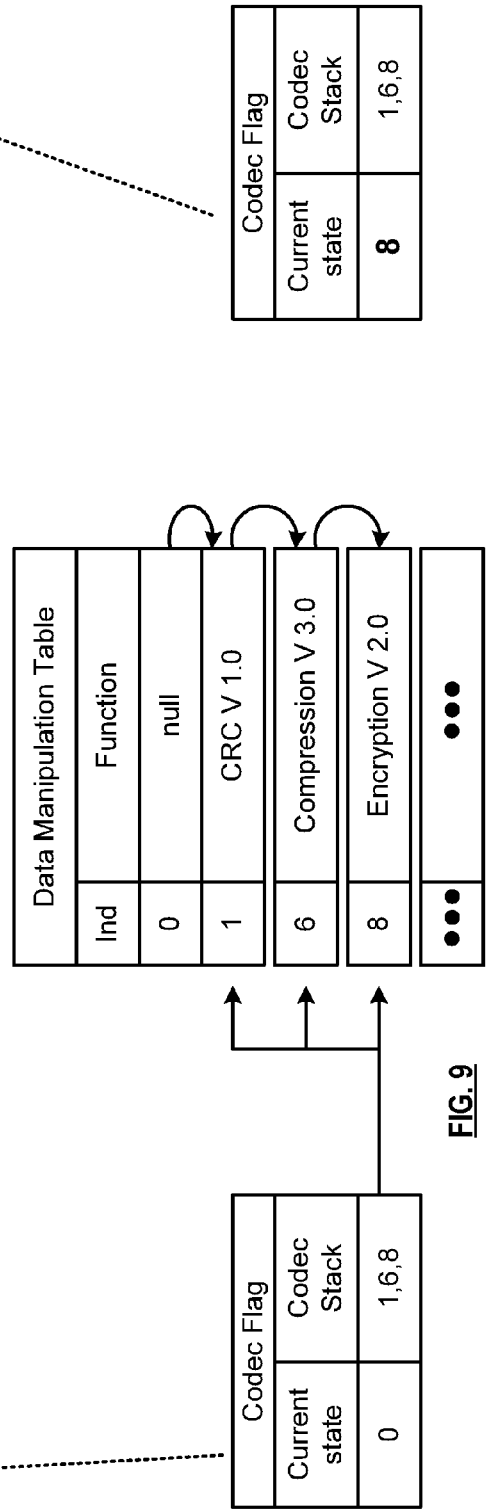
FIG. 9 is a diagram of an example of an embodiment of a dispersed storage data manipulation table in accordance with the invention.

FIG. 8 is a schematic block diagram of an example of a data manipulator performing a plurality of codec functions in accordance with a codec flag and the corresponding data manipulation table, which are shown in FIG. 9. With reference to FIGS. 8 and 9, the data manipulator goes through a series of steps (e.g., 0-8) to process a data segment in accordance with the associated codec flag. At step 0, the data manipulator receives a data segment and determines the current state to be 0 from the associated codec flag.

At step 1, the data manipulator determines the first codec function based on the codec stack field and a left to right ordering of the functions. In this example, the left most reference number is 1, which corresponds to the codec function of CRC version 1.0. Having made this determination, the data manipulator routes the data segment to the version 1.0 CRC codec module and changes the current state field to 1. The CRC module performs a CRC function on the data segment to produce a CRC data segment.

At step 2, the data manipulator determines the next codec function (which, in this example, is compression V3.0), routes the CRC data segment to the version 3.0 compression module, and changes the current state to 6 (e.g., the reference number of compression V3.0 codec function). At step 3, the compression V3.0 module performs a compression function on the CRC data segment to produce a compressed data segment, which it outputs at step 4.

At step 5, the data manipulator determines the next codec function (which, in this example, is encryption V2.0), routes the compressed data segment to the version 2.0 encryption module, and changes the current state to 8 (e.g., the reference number of encryption V2.0 codec function). At step 6, the encryption V2.0 module performs an encryption function on the compressed data segment to produce an encrypted data segment, which it outputs at step 7.

At step 7, the data manipulator determines that the codec stack is complete and by-passes further codec functions. At step 8, the data manipulator outputs the encrypted data segment as its output. Note that the data segment may be a data segment if the data manipulator is the pre-data manipulator and may be a plurality of encoded data slices if the data manipulator is a post-data manipulator.

Figure 10:
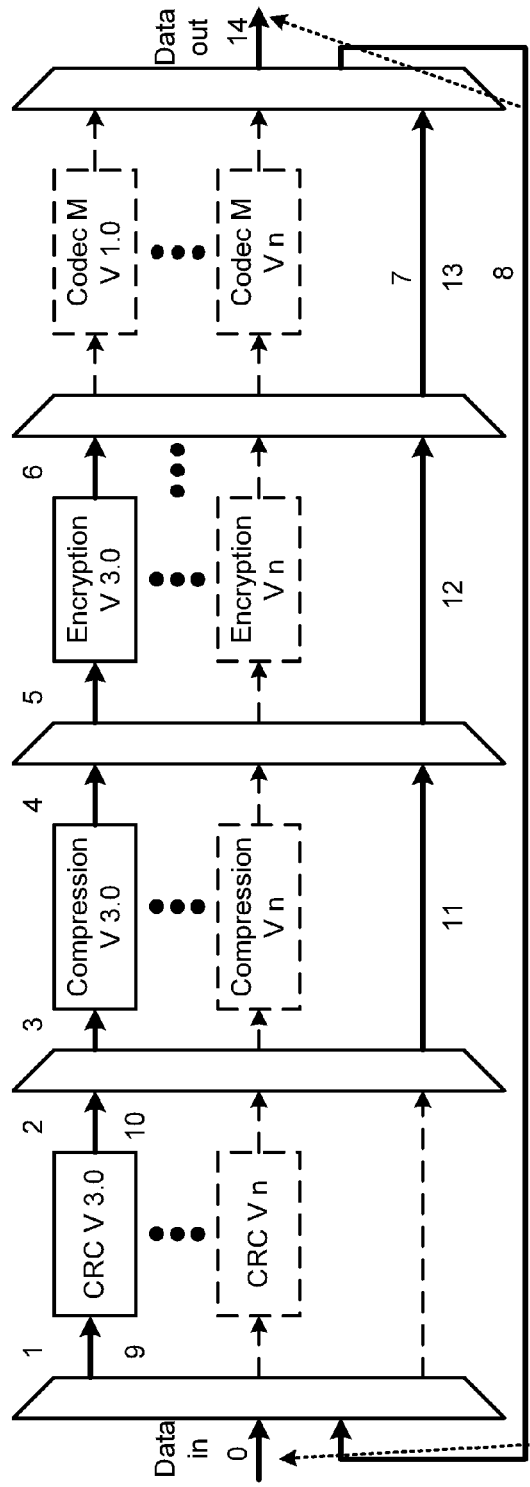
FIG. 10 is a schematic block diagram of another example of an embodiment of a data manipulator in accordance with the invention.
Figure 11:
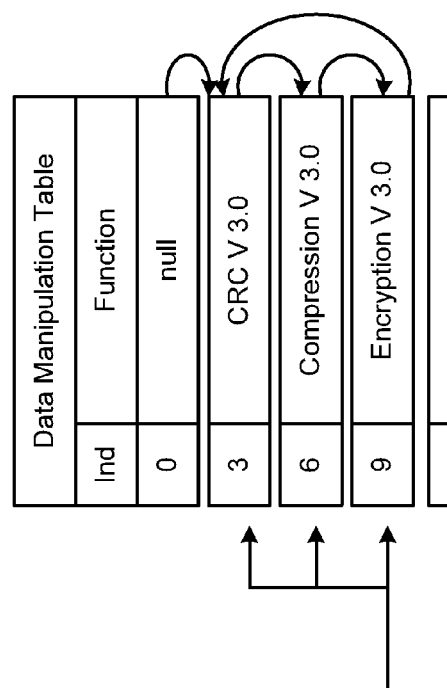
FIG. 11 is a diagram of another example of an embodiment of a dispersed storage data manipulation table in accordance with the invention.

FIG. 10 is a schematic block diagram of another example of a data manipulator performing a plurality of codec functions in accordance with a codec flag and the corresponding data manipulation table, which are shown in FIG. 11. With reference to FIGS. 10 and 11, the data manipulator goes through a series of steps (e.g., 0-14) to process a data segment in accordance with the associated codec flag. At step 0, the data manipulator receives a data segment and determines the current state to be 0 from the associated codec flag.

At step 1, the data manipulator determines the first codec function based on the codec stack field and a left to right ordering of the functions. In this example, the left most reference number is 3, which corresponds to the codec function of CRC version 3.0. Having made this determination, the data manipulator routes the data segment to the version 3.0 CRC codec module and changes the current state field to 3. The CRC module performs a CRC function on the data segment to produce a CRC data segment.

At step 2, the data manipulator determines the next codec function (which, in this example, is compression V3.0), routes the CRC data segment to the version 3.0 compression module, and changes the current state to 6 (e.g., the reference number of compression V3.0 codec function). At step 3, the compression V3.0 module performs a compression function on the CRC data segment to produce a compressed data segment, which it outputs at step 4.

At step 5, the data manipulator determines the next codec function (which, in this example, is encryption V3.0), routes the compressed data segment to the version 3.0 encryption module, and changes the current state to 9 (e.g., the reference number of encryption V3.0 codec function). At step 6, the encryption V3.0 module performs an encryption function on the compressed data segment to produce an encrypted data segment.

At step 7, the data manipulation module determines that the by-pass is enabled for the next codec sets (e.g., codec M, versions 1-n). At step 8, the data manipulation module determines that the encrypted data segment is to be feedback.

At step 9, the data manipulator determines the next codec function (which, in this example, is CRC V3.0), routes the encrypted data segment to the version 3.0 CRC module, and changes the current state to 3 (e.g., the reference number of CRC V3.0 codec function). At step 10, the CRC V3.0 module performs a CRC function on the compressed data segment to produce a CRC encrypted data segment.

At steps 11-13, the data manipulator determines that the codec stack is complete and by-passes further codec functions. At step 14, the data manipulator outputs the CRC encrypted data segment as its output. Note that the data segment may be a data segment if the data manipulator is the pre-data manipulator and may be a plurality of encoded data slices if the data manipulator is a post-data manipulator.

Note that the data manipulator may maintain an actual use codec stack and append the actual use codec stack to the data segment at each step of the above process. The actual use codec stack may represent the codec functions actually utilized in order of use in an onion fashion thereby enabling subsequent reversal of the manipulations by a future series of de-manipulations in the reverse order of the actual use codec stack. Node that a code ID of zero may represent where the stack ends.

Figure 12:
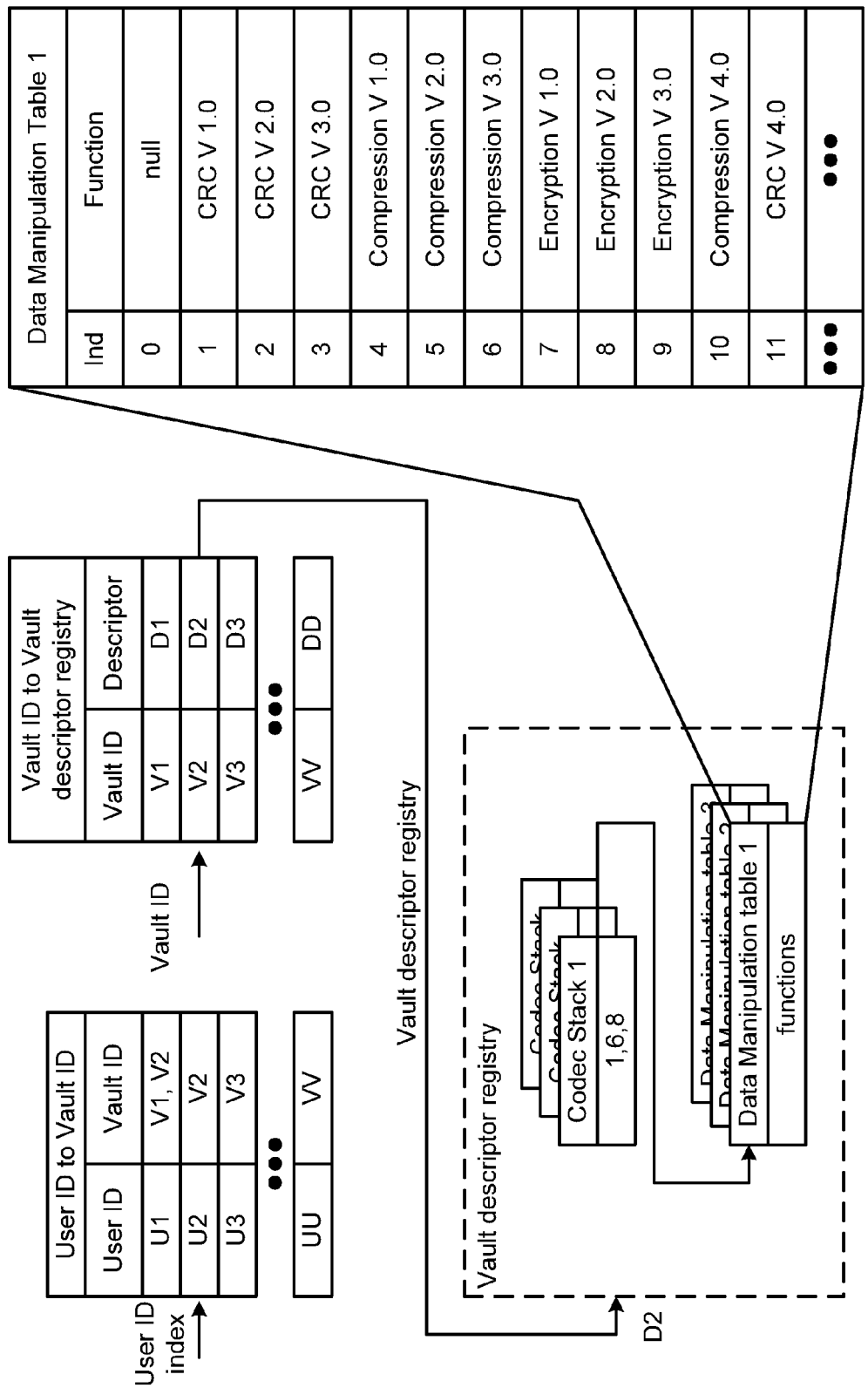
FIG. 12 is a diagram of an embodiment of a dispersed storage data manipulation table indexing hierarchy in accordance with the invention.

FIG. 12 is a diagram of an embodiment of a dispersed storage data manipulation table indexing hierarchy that includes a user identifier (ID) to vault identifier (ID) table, a vault ID to vault descriptor registry, and a vault descriptor registry. The vault descriptor registry may include one or more codec stacks and one or more data manipulation tables. The data manipulator, gateway module, access module, grid module and/or any other module or unit of the DSN may utilize the data manipulation table indexing hierarchy to provide the codec stack and data manipulation table for a particular user based on the user identifier. The user ID to vault ID table, the vault ID to vault descriptor registry, and the vault descriptor registry may be stored in one or more of the DS managing unit, the DS processing unit, the user device, the storage integrity processing unit, and/or the DSN memory.

In an example, the access module determines the vault ID (e.g., V2) based on the user ID (e.g., U2) of a user ID to vault ID table. The access module then determines the vault descriptor registry (e.g., D1) based on the vault ID (e.g., V2) of a vault ID to vault descriptor table. The vault descriptor registry may include one or more codec stacks assigned to a user and one or more data manipulation tables associated with this user. The access module then determines which codec stack and which data manipulation table to utilize based on one or more of the vault descriptor registry, the type of data, security requirements, available DSN memory, performance requirements, and/or other metadata.

While FIGS. 6-12 focused on the outbound path (i.e., the pre-data manipulator 75, the encoder 77, the slicer 79, and the post-data manipulator 81), the concepts of the present invention are equally applicable to the inbound path (i.e., the pre-data de-manipulator 83, the decoder 85, the de-slicer 87, and the post-data de-manipulator 89).

For example, the grid module 82 may receive a plurality of encoded data slices and a codec flag from a plurality of DS storage units. The codec flag indicates one or more codec types and a codec execution order, wherein the codec types include two or more of: a null data manipulation, one or more versions of a data integrity function, one or more versions of a compression function, and one or more versions of an encryption function. Note that the codec flag may be appended to one or more of the data slices such that it is decoded along with the slices. Alternatively, the codec flag may be received as appended code to one or more slices, thus not needed decoding.

The grid module then decodes the plurality of encoded data slices to produce manipulated data using an error coding dispersal storage function (e.g. in accordance with operational parameters of dispersed storage). The grid module then de-manipulates the manipulated data using the one or more codec types in the codec execution order to produce recovered data.

The grid module may also obtain a second codec flag, which it uses to de-manipulate at least one of the plurality of post data manipulated slices to produce the plurality of encoded data slices. In other words, the grid module post-data de-manipulates the slices in accordance with the first codec flag and pre-data de-manipulates the recovered data segment in accordance with the second codec flag.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A method for execution by a dispersed storage (DS) processing unit, the method comprises:
   receiving a data segment of a plurality of data segments of a data object for dispersed storage, wherein the data object has an associated user identification (ID) of a user;
   obtaining a codec flag based on the associated user ID, wherein the codec flag includes a current state field and a codec stack field, in which the current state field is initialized in a null state and in which the codec stack field contains numerical values in execution order to access respective numerical entries in a data manipulation table where the numerical entries correspond to different codec functions for use in manipulating the data segment, and wherein the codec functions listed in the data manipulation table include one or more versions of a data integrity function, one or more versions of a compression function, and one or more versions of an encryption function;
   manipulating the data segment using selected codec functions by selecting a first numerical value of the numerical values contained in the codec stack field in the execution order and placing the first numerical value in the current state field to perform a first codec function corresponding to a respective numerical entry in the data manipulation table and further manipulating the data segment by selecting subsequent numerical value or values contained in the codec stack field, one at a time in the execution order, for placing into the current state field to perform a respective codec function, until codec functions indicated in the codec stack field are completed to generate a manipulated data;

encoding the manipulated data using an error coding dispersal storage function to generate a plurality of encoded data slices for storage, wherein a read threshold number of encoded data slices of the plurality of encoded data slices are needed to recover the manipulated data, where the read threshold number of encoded data slices is less than a number corresponding to the plurality of encoded data slices; and outputting the plurality of encoded data slices and the codec stack field of the codec flag to a plurality of DS storage units for storage therein.

2. The method of claim 1, wherein the encoding further comprises:

appending the codec stack field of the codec flag to the manipulated data to produce appended manipulated data; and encoding the appended manipulated data using the error coding dispersal storage function to produce the plurality of encoded data slices.

3. The method of claim 1, wherein the outputting further comprises:

appending the codec stack field of the codec flag to the plurality of encoded data slices to produce an appended plurality of encoded data slices; and outputting the appended plurality of encoded data slices to the plurality of DS storage units for storage therein.

4. The method of claim 1 further comprises:

obtaining a second codec flag based on the associated user ID, wherein the codec stack field of the second codec flag indicates a second execution order of codec functions to perform in manipulating the plurality of encoded data slices;

manipulating the plurality of encoded data slices using one or more codec functions corresponding to the codec stack field of the second codec flag in the second codec execution order to generate manipulated encoded data slices; and outputting the plurality of encoded data slices as the manipulated encoded data slices, along with the codec stack field of the second codec flag to the plurality of DS storage units for storage therein.

5. The method of claim 1, wherein the codec stack field of the codec flag further has repeat numerical values to perform a same codec function, but at a different period in the execution order.

6. The method of claim 1, wherein the obtaining further comprises:

identifying a vault identity (ID) based on the associated user ID;

identifying a registry descriptor based on the vault ID; and accessing the registry descriptor from a plurality of registry descriptors to retrieve vault information, wherein the vault information includes a codec stack for the codec stack field and identifies the data manipulation table.

7. A method for execution by a dispersed storage (DS) processing unit, the method comprises:

providing access to at least a threshold number of a plurality of encoded data slices of a data segment of a plurality of data segments of a data object stored within a plurality of DS storage units, wherein the threshold number of encoded data slices of the plurality of encoded data slices are needed to recover the data segment, the threshold number of encoded data slices being less than the plurality of encoded data slices;

receiving a codec stack field of a codec flag and the threshold number of encoded data slices of the plurality of encoded data slices from the plurality of DS storage units, wherein the codec stack field contains numerical values in execution order to access respective numeric entries in a data manipulation table where the numerical entries correspond to different codec functions for use in recovering the data segment from the threshold number of encoded data slices, and wherein the codec functions listed in the data manipulation table include one or more versions of a data integrity function, one or more versions of a compression function, and one or more versions of an encryption function;

decoding the threshold number of encoded data slices using an error coding dispersal storage function to produce manipulated data; and de-manipulating the manipulated data using selected codec functions by selecting a first numerical value of the numerical values contained in the codec stack field in the execution order and placing the first numerical value in a current state field of the codec flag to perform a first codec function corresponding to a respective numerical entry in the data manipulation table and further de-manipulating the manipulated data by selecting subsequent numerical value or values contained in the codec stack field, one at a time in the execution order, for placing into the current state field to perform a respective codec function, until codec functions indicated in the codec stack field are completed to recover the data segment.

8. The method of claim 7 further comprises:

receiving the threshold number of encoded data slices from the plurality of DS storage units;

decoding the threshold number of encoded data slices using the error coding dispersal storage function to produce appended manipulated data; and separating the appended manipulated data to produce the manipulated data and the codec stack field.

9. The method of claim 7 further comprises:

receiving an appended threshold number of encoded data slices from the plurality of DS storage units; and separating the appended encoded data slices to produce the threshold number of encoded data slices and the codec stack field.

10. The method of claim 7 further comprises:

receiving the threshold number of encoded data slices, the codec stack field, and a second codec field from the plurality of DS storage units, wherein the second codec stack field indicates a second execution order of codec functions to perform in de-manipulating the manipulated data; and de-manipulating at least one of the plurality of encoded data slices using the second execution order.

11. A dispersed storage (DS) processing unit comprises:

a network interface; and a processing module operable to:

obtain a data segment of a plurality of data segments of a data object for dispersed storage, wherein the data object has an associated user identification (ID) of a user;

obtain a codec flag based on the associated user ID, wherein the codec flag includes a current state field and a codec stack field, in which the current state field is initialized in a null state and in which the codec stack field contains numerical values in execution order to access respective numerical entries in a data manipulation table where the numerical entries correspond to different codec functions for use in manipulating the data segment, and wherein the codec functions listed in the data manipulation table include one or more versions of a data integrity function, one or more versions of a compression function, and one or more versions of an encryption function;

manipulate the data segment using selected codec functions by selecting a first numerical value of the numerical values contained in the codec stack field in the execution order and placing the first numerical value in the current state field to perform a first codec function corresponding to a respective numerical entry in the data manipulation table and further manipulating the data segment by selecting subsequent numerical value or values contained in the codec stack field, one at a time in the execution order, for placing into the current state field to perform a respective codec function, until codec functions indicated in the codec stack field are completed to generate a manipulated data;

encode the manipulated data using an error coding dispersal storage function to generate a plurality of encoded data slices for storage, wherein a read threshold number of encoded data slices of the plurality of encoded data slices are needed to recover the manipulated data, where the read threshold number of encoded data slices is less than a number corresponding to the plurality of encoded data slices; and output, via the network interface, the plurality of encoded data slices and the codec stack field of the codec flag to a plurality of DS storage units for storage therein.

12. The DS processing unit of claim 11, wherein the processing module further functions to encode by:
appending the codec stack field of the codec flag to the manipulated data to produce appended manipulated data; and
encoding the appended manipulated data using the error coding dispersal storage function to produce the plurality of encoded data slices.

13. The DS processing unit of claim 11, wherein the processing module further functions to output by:
appending the codec stack field of the codec flag to the plurality of encoded data slices to produce an appended plurality of encoded data slices; and
outputting, via the network interface, the appended plurality of encoded data slices to the plurality of DS storage units for storage therein.

14. The DS processing unit of claim 11, wherein the processing module further functions to:
obtain a second codec flag based on the associated user ID, wherein the codec stack field of the second codec flag indicates a second execution order of coded functions to perform in manipulating the plurality of encoded data slices;
manipulate the plurality of encoded data slices using one or more codec functions corresponding to the codec stack field of the second codec flag in the second codec execution order to generate manipulated encoded data slices; and
output, via the network interface, the plurality of encoded data slices as the manipulated encoded data slices, along with the codec stack field of the second codec flag to the plurality of DS storage units for storage therein.

15. The DS processing unit of claim 11, wherein the codec stack field of the codec flag further has repeat numerical values to perform a same codec function, but at a different period in the execution order.

16. The DS processing unit of claim 11, wherein the processing module further functions to obtain the codec flag by:
identifying a vault identity (ID) based on the associated user ID;
identifying a registry descriptor based on the vault ID; and
accessing the registry descriptor from a plurality of registry descriptors to retrieve vault information, wherein the vault information includes a codec stack for the codec stack field and identifies the data manipulation table.

17. A dispersed storage (DS) processing unit comprises:
a network interface; and
a processing module operable to:
provide, via the network interface, access to at least a threshold number of a plurality of encoded data slices of a data segment of a plurality of data segments of a data object stored within a plurality of DS storage units, wherein the threshold number of encoded data slices of the plurality of encoded data slices are needed to recover the data segment, the threshold number of encoded data slices being less than the plurality of encoded data slices;
receive, via the network interface, a codec stack field of a codec flag and the threshold number of encoded data slices of the plurality of encoded data slices from the plurality of DS storage units, wherein the codec stack field contains numerical values in execution order to access respective numeric entries in a data manipulation table where the numerical entries correspond to different codec functions for use in recovering the data segment from the threshold number of encoded data slices, and wherein the codec functions listed in the data manipulation table include one or more versions of a data integrity function, one or more versions of a compression function, and one or more versions of an encryption function;
decode the threshold number of encoded data slices using an error coding dispersal storage function to produce manipulated data; and
de-manipulate the manipulated data using selected codec functions by selecting a first numerical value of the numerical values contained in the codec stack field in the execution order and placing the first numerical value in a current state field of the codec flag to perform a first codec function corresponding to a respective numerical entry in the data manipulation table and further de-manipulating the manipulated data by selecting subsequent numerical value or values contained in the codec stack field, one at a time in the execution order, for placing into the current state field to perform a respective codec function, until codec functions indicated in the codec stack field are completed to recover the data segment.

18. The DS processing unit of claim 17, wherein the processing module further functions to:
receive, via the network interface, the threshold number of encoded data slices from the plurality of DS storage units;
decode the threshold number of encoded data slices using the error coding dispersal storage function to produce appended manipulated data; and
separate the appended manipulated data to produce the manipulated data and the codec stack field.

19. The DS processing unit of claim 17, wherein the processing module further functions to:
- receive, via the network interface, an appended threshold number of encoded data slices from the plurality of DS storage units; and
- separate the appended encoded data slices to produce the threshold number of encoded data slices and the codec stack field.

20. The DS processing unit of claim 17, wherein the processing module further functions to:
- receive the threshold number of encoded data slices, the codec stack field, and a second codec stack field from the plurality of DS storage units wherein the second codec stack field indicates a second execution order of codec functions to perform in de-manipulating the manipulated data; and
- de-manipulate at least one of the plurality of encoded data slices using the second execution order.

\* \* \* \* \*